United States Patent [19]

Rozeboom

[11] 4,407,372
[45] Oct. 4, 1983

[54] DISK HARROW WITH CUSHION GANG

[75] Inventor: Henry Rozeboom, Bolingbrook, Ill.

[73] Assignee: International Harvester Co., Chicago, Ill.

[21] Appl. No.: 303,290

[22] Filed: Sep. 17, 1981

[51] Int. Cl.³ .................. A01B 21/08; A01B 35/28; A01B 61/04
[52] U.S. Cl. .................. 172/572; 267/36 R
[58] Field of Search .......... 172/572, 707, 708, 500, 172/711, 573; 267/36 R, 164, 44, 22 A

[56] References Cited

U.S. PATENT DOCUMENTS

| | | | |
|---|---|---|---|
| 417,746 | 12/1889 | Shank | 172/707 |
| 1,167,938 | 1/1916 | Scheidt | 267/36 R |
| 1,173,850 | 2/1916 | Oliver | 267/36 R |
| 2,259,890 | 10/1941 | Hipple | 172/707 X |
| 2,750,861 | 6/1956 | Erwin | 172/573 |
| 3,279,869 | 10/1966 | Anderson | 172/711 X |
| 3,640,348 | 2/1972 | Womble | 172/573 |
| 4,066,132 | 1/1978 | Rehn | 172/572 |
| 4,333,535 | 6/1982 | Hentrich | 172/566 |

OTHER PUBLICATIONS

Krause Tandem Disc Harrow Advertising Brochure of Krause Plow Corp. Hutchinson KS 1978.

Primary Examiner—Richard J. Johnson
Attorney, Agent, or Firm—Dennis K. Sullivan; F. David AuBuchon

[57] ABSTRACT

A harrow that includes a frame having a generally laterally extending rigid beam, a shaft located below the beam, a plurality of spaced disks mounted on the shaft for rotation therewith and a pair of spaced bearing standards for resiliently mounting the shaft on the beam with each standard including a first generally C-shaped spring having an upper portion connected to the beam and the lower portion rotatably supporting the shaft for low disk impact loads and a second C-shaped spring nested within the first C-shaped spring but spaced therefrom, the first spring, as an increasing portion of its C-periphery contacts the second spring, providing therewith a graduated, higher spring rate at high disk impact loads.

4 Claims, 3 Drawing Figures

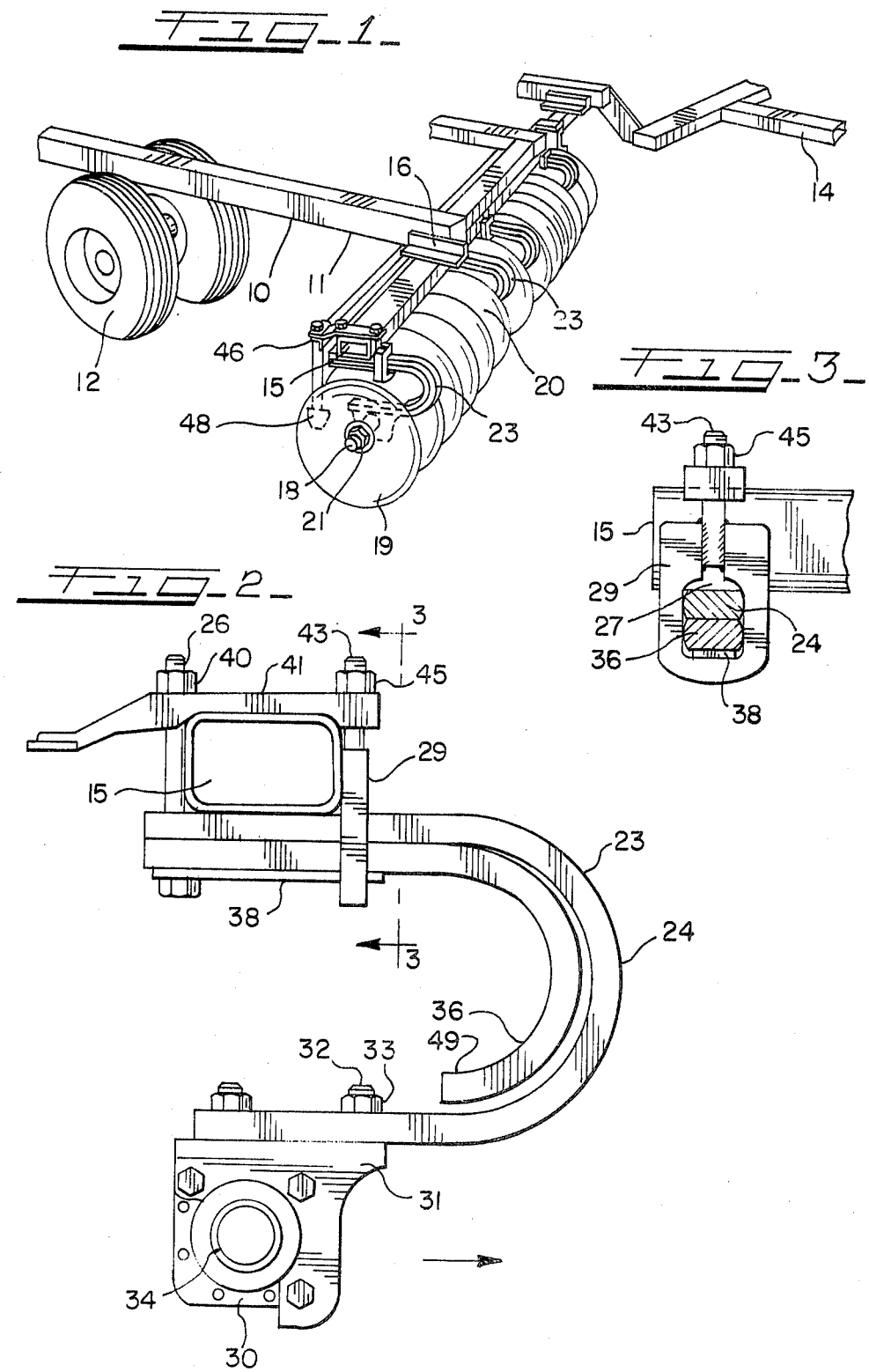

DISK HARROW WITH CUSHION GANG

BACKGROUND OF THE INVENTION

1. Field of the Invention

This invention pertains generally to agricultural implements and more particularly to structure for resiliently mounting a gang of earth working tools on the implement frame.

2. Description of the Prior Art

In tillable farmland that is infested with rocks, stumps or roots, it is necessary to provide resilient mounting for the disk gangs of harrows to the harrow frame to reduce impact loads transmitted thereto and to reduce damage to the gang components.

Various springs or torsion bars have been used for this purpose in the past to cushion impact loads in vertical and fore-and-aft directions. However, all have utilized only one spring per shaft standard or more than one spring—but with all springs acting simultaneously. Where one spring has been used, it may be allowed to deflect to a degree where the disks impact the harrow frame. Bottoming devices, in conjunction with high impact loads, frequently also provide a severe impact to the implement.

SUMMARY OF THE INVENTION

Applicant, in view of the disadvantages detailed above, designed a resilient mounting or bearing standard for the disk gang shaft that incorporates two springs specifically positioned to provide graduated resilience at low impact loads by one spring and increased resilience at high impact loads when both springs are utilized. The resilient mounting provides protection against generally rearward and vertical loads (and the more common loads therebetween) applied to the disks. No bottoming devices are required. Specifically, applicant utilizes a first generally C-shaped spring that has its closed end facing the direction of travel of the implement. The upper portion of the spring is connected to the gang beam and the lower portion rotatably supports the disk shaft located thereunder. The second C-shaped spring is nested in the first spring, although slightly spaced therefrom, and has an upper portion connected to the first spring and a free end adjacent the lower portion of the first spring. On high impact rearward loads imparted to the disks, the first spring deflects, gradually engaging the C-shaped portion of the second spring and gradually increasing the spring rate of the combined springs due to the increase in spring section. Impact loads of 10,000 lbs can be accommodated without bottoming while retaining the single spring action of the first spring at low impact loads. Preferably the shaft is also positioned abreast of the gang beam for aligned harrow weight to be applied to the shaft and other disks during tillage. During vertical impact loads the first spring also free end engages the free end of the second spring providing an abrupt increase in spring rate. The resulting stiffer spring combination also permits the mounting of the disk scrapers generally adjacent the gang beam without interference from the disk spacer spools and, therefore, keeps clear the trash "build up" area between the shaft and beam.

It is therefore an object of this invention to provide a new and improved disk harrow.

Another object of this invention is to provide a harrow disk gang dual spring standard suitable for low and high disk impact loads.

BRIEF DESCRIPTION OF THE DRAWINGS

FIG. 1 is a perspective view of a portion of a harrow and a disk gang supported therefrom by the resilient mounting of this invention;

FIG. 2 is a side view of the resilient mounting of this invention with the disks removed; and FIG. 3 is a sectional view taken along line 3—3 of FIG. 2.

DESCRIPTION OF THE PREFERRED EMBODIMENT

Referring to FIGS. 1-3, 10 indicates a portion of a disk harrow. Harrow 10 has a frame 11 on which are mounted rotatable support wheels 12. Harrow 10 also has hitch tongue 14 suitable for connection to a tractor for towing. Also, a part of frame 11 is generally laterally extending rectangular beam or gang bar 15 rigidly connected thereto by angles 16 welded to frame 11 and suitable fasteners. Gang shaft 18 is located preferably directly below beam 15 and its center is essentially abreast of the center of beam 15. Mounted on shaft 18 at spaced intervals by conventional spools are ground working disks 19 of gang 20 which are rotatable with shaft 18 due to the frictional force provided by 800 ft. lbs. torque to nut 21.

Connecting shaft 18 and disks 19 to beam 15 in a resilient manner are at least a pair of spaced bearing standards 23. Standard 23 is shown best in FIGS. 2 and 3. Standard 23 includes a first generally C-shaped spring 24 with the upper and rearward portion of the spring 24 being extended and having an opening therethrough for bolt 26. The upper portion of spring 24 also extends through an opening 27 in bracket 29. Spring 24 then curves in the C-shaped configuration downwardly with the C closed in the direction of travel indicated by the arrow in FIG. 2 to prevent the collection of trash during ground working. The lower portion of spring 24 has a substantially horizontal section fastened to bearing housing 30 by bracket 31 via bolts 32 and nuts 33. Bearing housing 30 is conventional and has a two-piece construction for the outer partially self-aligning ball race and the inner race 34 shown which would rotate with shaft 18.

Also, mounted adjacent first spring 24 and nesting therein but slightly spaced therefrom in the unloaded condition is second spring 36. Second spring 36 has a C-shaped configuration similar to first spring 24. At the upper and rearward portion of spring 36 is a hole for bolt 26 which extends therethrough. Also, adjacent spring 36 is plate 38 having a similar opening. Plate 38 is located below spring 36 and is welded to bracket 29. Nut 40 fastened to bolt 26 holds plate 38, springs 24 and 36 tightly to beam 15 via upper clamp 41. Clamp 41 extends across the top of beam 15 and has an opening for stud 43 rigidly fastened in bracket 29. Nut 45 threaded to stud 43 rigidly secures plate 38 and second spring 36 which extends through the opening 27 in bracket 29 with spring 24, together. Plate 38 is essentially a spacer for use with the fabricated bracket 29 and the springs. Also, supported from clamp 41 is angle 46 which rigidly supports the scraper 48 for each disk to beam 15.

As shown best in FIG. 2, spring 35 has a lower free end 49 adjacent the lower horizontal portion of spring 24 but spaced therefrom. In the non-loaded position shown, end 49 and the C-shaped periphery of spring 36 is spaced from the comparable periphery of spring 24. Thus, on low impact loads on the disks 19 and thus the shaft bearing housing 30, only spring 24 is utilized. On larger loads both springs are utilized.

In operation, as the disks 19 and thus bearing housing 30 encounter an impact load in the rearward or generally rearward direction, same is initially cushioned by spring 24. On higher loads spring 24 is moved rearward and gradually contacts the C-shaped configuration of the second spring 36 and due to the now increased section provides a gradually increasing spring rate to prevent a sudden high impact load to the implement. The location of the free end 49 of spring 36 adjacent the lower end of spring 24 instead of the upper end is necessary under this load condition.

Under light, generally vertical impact loads, the first spring cushions the loads alone. When heavy vertical impact loads are encountered, or when the implement passes over an obstacle, the free end 49 of spring 36 is initially engaged by the lower horizontal portion of spring 24 thereby fully engaging both springs and abruptly increasing the spring rate to resist the load without bottoming.

What is claimed is:

1. A disk harrow comprising a frame adapted to be towed and having a generally laterally extending rigid supporting beam, a shaft located below said beam and a plurality of spaced disks mounted on such shaft for rotation therewith, at least a pair spaced bearing standards for resiliently mounting said shaft to said beam, each standard comprising a first generally C-shaped spring with the closed portion of the spring facing the direction of travel, said first spring having an upper portion connected to said beam and a substantially horizontal lower portion rotatably supporting said shaft for low disk impact modes, and a second C-shaped spring nested within the first C-shaped spring having its upper end connected to the first spring, a medial portion spaced therefrom generally along the C-periphery, and a free lower end adjacent said lower horizontal portion of said first spring, generally rearward loads on said disks causing a gradual increase in the spring rate acting on said disks with increasing peripheral contact between said first and second springs and vertical loads on said disks causing an abrupt increase in the spring rate upon said free end of said second spring contacting the horizontal portion of said first spring.

2. The disk harrow of claim 1 in which said shaft is located abreast of said beam.

3. The disk harrow of claim 2 further comprising a bracket having an opening therethrough for the upper portions of the first and second springs, said bracket being located adjacent the forward end of the beam, a top clamp and first fastening means for securing the bracket to the clamp, and second fastening means for securing the first and second springs to the clamp at the rearward end of the beam.

4. The disk harrow of claim 3 further comprising disk scraper means supported from said clamp.

* * * * *